(12) United States Patent
Takagi et al.

(10) Patent No.: US 10,101,647 B2
(45) Date of Patent: Oct. 16, 2018

(54) ILLUMINATOR AND PROJECTOR

(71) Applicant: SEIKO EPSON CORPORATION, Tokyo (JP)

(72) Inventors: Kunihiko Takagi, Okaya (JP); Tetsuo Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/892,570

(22) Filed: Feb. 9, 2018

(65) Prior Publication Data

US 2018/0246400 A1   Aug. 30, 2018

(30) Foreign Application Priority Data

Feb. 24, 2017   (JP) .................................. 2017-033022

(51) Int. Cl.
*B60Q 3/51*   (2017.01)
*B60Q 3/00*   (2017.01)
*G03B 21/20*   (2006.01)

(52) U.S. Cl.
CPC ....... *G03B 21/2066* (2013.01); *G03B 21/204* (2013.01); *G03B 21/2053* (2013.01); *G03B 21/2093* (2013.01); *G03B 21/208* (2013.01)

(58) Field of Classification Search
CPC ......... B60Q 3/51; B60Q 3/00; F21W 2106/00
USPC ......................................... 362/488, 487, 651
See application file for complete search history.

(56) References Cited

U.S. PATENT DOCUMENTS

| 6,124,979 A * | 9/2000 | Hirata ...................... G02B 9/12 |
| | | 359/651 |
| 2012/0140183 A1 | 6/2012 | Tanaka et al. |
| 2017/0139312 A1* | 5/2017 | Kato .................... G02B 26/008 |

FOREIGN PATENT DOCUMENTS

JP   2012-137744 A   7/2012

\* cited by examiner

*Primary Examiner* — Edwyn Labaze
(74) *Attorney, Agent, or Firm* — Oliff PLC

(57) ABSTRACT

The color separation/light combining element included in an illuminator has at least one first region and at least one second region. The light ray flux contains a first light ray flux outputted from the first light emission unit and a second light ray flux outputted from the second light emission unit. a wavelength conversion element, a diffusive reflection element, and the color separation/light combining element are so disposed that part of the first light ray flux is incident on the diffusive reflection element via the first region, the other part of the first light ray flux is incident on the wavelength conversion element via the first region, a part of the second light ray flux is incident on the wavelength conversion element via the second region, and the second region combines the converted light with a part of light reflected off the diffusive reflection element to produce illumination light.

12 Claims, 7 Drawing Sheets

ILLUMINATOR AND PROJECTOR

BACKGROUND

1. Technical Field

The present invention relates to an illuminator and a projector.

2. Related Art

As an illuminator for a projector, there is a technology for rotating a retardation film that transmits light from a solid-state light source unit including a plurality of semiconductor lasers to change the ratio between an S-polarized component reflected off a dichroic mirror and incident on a fluorescence emission plate and a P-polarized component that passes through the dichroic mirror and is incident on a reflection plate (see JP-A-2012-137744, for example).

In the technology of related art described above, however, the retardation film is made of quartz to prevent damage due to the high-energy laser beam outputted from the solid-state light source unit. In the illuminator, two retardation plates made of quartz are used, resulting in a problem of a very high cost.

SUMMARY

An advantage of some aspects of the invention is to provide an illuminator that allows cost reduction. Another advantage of some aspects of the invention is to provide a projector including the illuminator.

According to a first aspect of the invention, an illuminator is provided. The illuminator includes a light source apparatus that includes a first light emission unit and a second light emission unit and outputs a light ray flux that belongs to a first wavelength band, a wavelength conversion element that converts the light ray flux into converted light that belongs to a second wavelength band, a color separation/light combining element that is provided in an optical path between the light source apparatus and the wavelength conversion element and reflects or transmits the converted light, and a diffusive reflection element, wherein the color separation/light combining element has at least one first region and at least one second region that differ from each other in terms of a ratio between reflectance and transmittance of the light ray flux, the light ray flux outputted from the light source apparatus contains a first light ray flux outputted from the first light emission unit and a second light ray flux outputted from the second light emission unit, and the wavelength conversion element, the diffusive reflection element, and the color separation/light combining element are so disposed that part of the first light ray flux is incident on the diffusive reflection element via the first region, another part of the first light ray flux is incident on the wavelength conversion element via the first region, at least part of the second light ray flux is incident on the wavelength conversion element via the second region, and the second region combines the converted light with at least part of light reflected off the diffusive reflection element to produce illumination light.

The illuminator according to the first aspect can separate the light fluxes outputted from the two light emission units into a light flux toward the wavelength conversion element and a light flux toward the diffusive reflection element with use of no retardation film to produce illumination light. The part cost of the illuminator can therefore be reduced.

In the first aspect described above, it is preferable that the second region has a wavelength separation function of separating light that belongs to the first wavelength band and light that belongs to the second wavelength band from each other.

According to the configuration described above, at least part of the light reflected off the diffusive reflection element can be efficiently combined with the converted light from the wavelength conversion element to produce illumination light. Loss of the reflected light in the combination process of producing the illumination light can therefore be reduced.

In the first aspect described above, it is preferable that the at least one first region has a shape symmetric around a center axis of the light ray flux.

According to the configuration described above, illumination light formed of the reflected light and the converted light uniformly distributed around the center axis of the illumination light can be produced. The reflected light and the converted light can therefore be readily superimposed on each other in an illuminated region.

In the first aspect described above, it is preferable that the at least one first region is formed of a plurality of first regions, and that the plurality of first regions are arranged symmetrically around the center axis of the light ray flux.

According to the configuration described above, illumination light formed of the reflected light and the converted light more uniformly distributed around the center axis can be produced.

In the first aspect described above, it is preferable that the color separation/light combining element includes a substrate having a first surface and a second surface facing each other, a first optical film that forms the at least one first region, and a second optical film that forms the at least one second region, that the first optical film is provided on the first surface of the substrate, that the second optical film is provided on the second surface of the substrate, and that at least part of the first optical film overlaps with the second optical film in a plan view of the color separation/light combining element.

According to the configuration described above, in which a circumferential edge section of the first optical film overlaps with the second optical film, no gap is created between the first region and the second region in the plan view of the color separation/light combining element. The light ray flux is therefore incident on either the first region or the second region and can be used to produce the illumination light, whereby the amount of loss of the light ray flux can be reduced.

In the first aspect described above, it is preferable that the illuminator further includes a controller that controls the first light emission unit and the second light emission unit in such a way that a ratio between an amount of the first light ray flux and an amount of the second light ray flux is adjusted.

According to the configuration described above, the controller can adjust the ratio between the amount of the first light ray flux and the amount of the second light ray flux. The color balance (white balance) of the illumination light can thus be adjusted.

According to a second aspect of the invention, a projector is provided. The projector includes the illuminator according to the first aspect described above, a light modulator that modulates the illumination light from the illuminator in accordance with image information to produce image light, and a projection system that projects the image light.

The projector according to the second aspect includes the illuminator that produces the illumination light with no use of a retardation film, whereby the cost of the projector itself can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
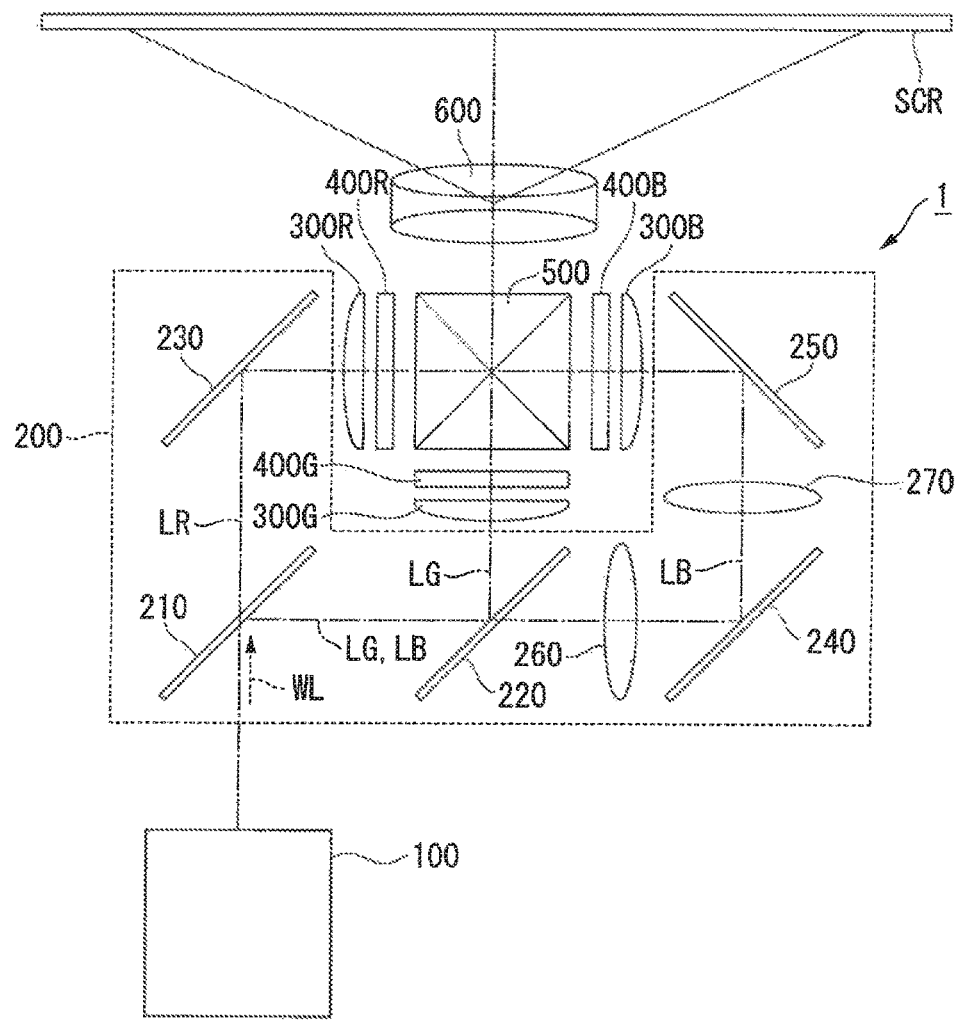
FIG. 1 is a schematic view showing the optical system of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a projector according to an embodiment of the invention will first be described.

FIG. 1 shows a schematic configuration of the projector according to the present embodiment.

A projector 1 includes an illuminator 100, a color separation/light guide system 200, light modulators 400R, 400G, and 400B, a cross dichroic prism 500, and a projection system 600, as shown in FIG. 1.

In the present embodiment, the illuminator 100 outputs white illumination light WL containing red light, green light, and blue light.

The color separation/light guide system 200 includes dichroic mirrors 210 and 220, reflection mirrors 230, 240, and 250, and relay lenses 260 and 270. The color separation/light guide system 200 separates the illumination light WL from the illuminator 100 into red light LR, green light LG, and blue light LB and guides the red light LR, the green light LG, and the blue light LB to the corresponding light modulators 400R, 400G, and 400B.

Field lenses 300R, 300G, and 300B are disposed between the color separation/light guide system 200 and the light modulators 400R, 400G, 400B.

The dichroic mirror 210 is a dichroic mirror that transmits a red light component and reflects a green light component and a blue light component. The dichroic mirror 220 is a dichroic mirror that reflects the green light component and transmits the blue light component. The reflection mirror 230 is a reflection mirror that reflects the red light component. The reflection mirrors 240 and 250 are reflection mirrors that reflect the blue light component.

The light modulators 400R, 400G, and 400B are each formed of a liquid crystal panel that modulates color light incident thereon in accordance with image information to form image light.

Although not shown, light-incident-side polarizers are disposed between the field lenses 300R, 300G, 300B and the light modulators 400R, 400G, 400B, and light-exiting-side polarizers are disposed between the light modulators 400R, 400G, 400B and the cross dichroic prism 500.

The cross dichroic prism 500 combines the image light fluxes outputted from the light modulators 400R, 400G, and 400B with one another to form a color image.

The cross dichroic prism 500 is formed by bonding four rectangular prisms to each other and therefore has a roughly square shape in a plan view, and dielectric multilayer films are formed along the roughly X-letter-shaped interfaces between the bonded rectangular prisms.

The color image having exited out of the cross dichroic prism 500 is enlarged and projected by the projection system 600.

Illuminator

Figure 2:
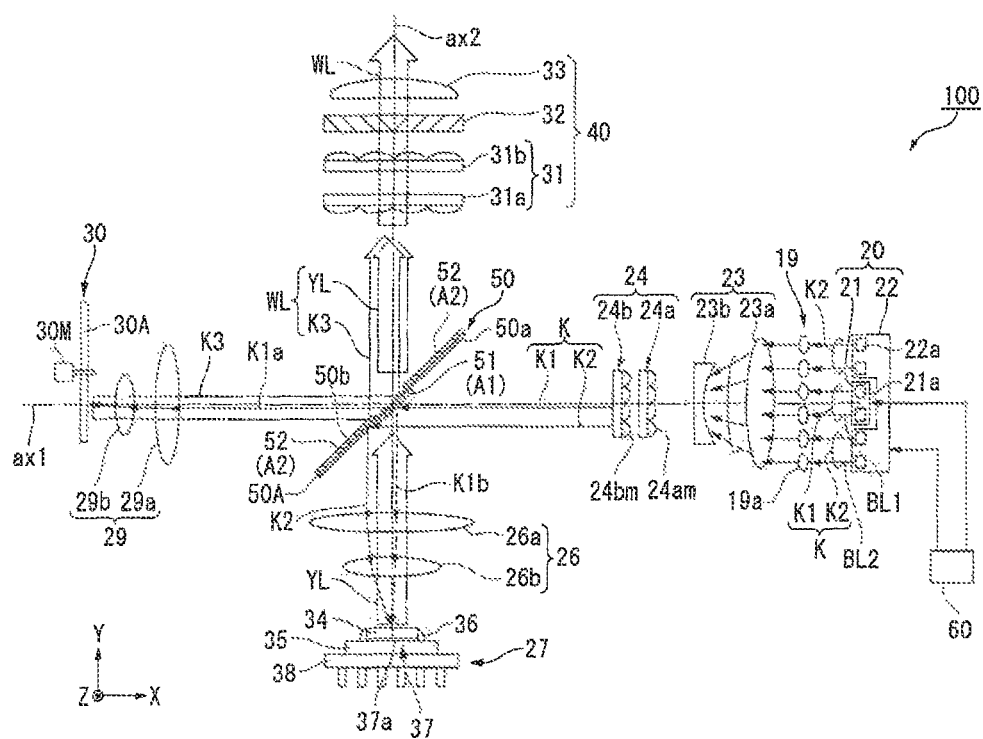
FIG. 2 shows a schematic configuration of an illuminator.

FIG. 2 is a plan view showing a schematic configuration of the illuminator 100. In the following drawings, each component of the illuminator 100 will be described by using an XYZ coordinate system. In FIG. 2, the X direction is the direction parallel to an optical axis ax1, the Y direction is the direction parallel to an optical axis ax2 perpendicular to the optical axis ax1, and the Z direction is the direction perpendicular to the X and Y directions.

The illuminator 100 includes a light source apparatus 20, a collimator system 19, an afocal system 23, a homogenizer system 24, a color separation/light combining element 50, a first light collection system 26, a fluorescence emission element 27, a second light collection system 29, a diffusive reflection element 30, a uniform illumination system 40, and a controller 60, as shown in FIG. 2.

The light source apparatus 20, the collimator system 19, the afocal system 23, the homogenizer system 24, the color separation/light combining element 50, the second light collection system 29, and the diffusive reflection element 30 are sequentially arranged along the optical axis ax1.

The fluorescence emission element 27, the first light collection system 26, the color separation/light combining element 50, and the uniform illumination system 40 are sequentially arranged along the optical axis ax2. The optical axes ax1 and ax2 are located in the same plane.

The light source apparatus 20 includes a first light emission unit 21 and a second light emission unit 22.

The first light emission unit 21 includes a plurality of semiconductor lasers 21a. The semiconductor lasers 21a each emit a light ray BL1 formed, for example, of a blue laser beam that belongs to a first wavelength band and has a peak wavelength of 460 nm. On the basis of the configuration described above, the first light emission unit 21 outputs a first light ray flux K1 formed of a plurality of light rays BL1.

The second light emission unit 22 includes a plurality of semiconductor lasers 22a. The semiconductor lasers 22a each emit a light ray BL2 formed, for example, of a blue laser beam that belongs to the first wavelength band and has the peak wavelength of 460 nm. On the basis of the configuration described above, the second light emission unit 22 outputs a second light ray flux K2 formed of a plurality of light rays BL2.

The controller 60 controls each component of the projector 1 including the illuminator 100. The controller 60 is electrically connected to the light source apparatus 20 and controls the first light emission unit 21 and the second light emission unit 22 in such a way that the ratio between the amount of the first light ray flux K1 and the amount of the second light ray flux K2 is adjusted. For example, the controller 60 controls operation of driving the first light emission unit 21 and the second light emission unit 22 on the basis of a result of detection performed by a light detection sensor that is not shown.

In the present embodiment, the light source apparatus 20 outputs a light ray flux K containing the first light ray flux K1 and the second light ray flux K2. The first light ray flux K1 and the second light ray flux K2 are each formed of light having a first wavelength (blue laser beam). The light source apparatus 20 therefore outputs the light ray flux K1 that belongs to the first wavelength band.

The light ray flux K outputted from the light source apparatus 20 enters the collimator system 19. The collimator system 19 parallelizes the light rays BL1 and BL2 outputted from the light source apparatus 20 to convert the light ray flux K into a parallelized light flux. The collimator system 19 is formed, for example, of a plurality of collimator lenses 19a arranged in an array. The plurality of collimator lenses 19a are disposed in correspondence with the plurality of semiconductor lasers 21a and 22a.

The light ray flux K having passed through the collimator system 19 enters the afocal system 23. The afocal system 23 adjusts the light flux diameter of the light ray flux K. The afocal system 23 is formed, for example, of a convex lens 23a and a concave lens 23b.

The light ray flux K having passed through the afocal system 23 enters the homogenizer system 24. The homogenizer system 24 cooperates with the first light collection system 26 to homogenize the illuminance distribution of light to be incident on a phosphor layer 34. The homogenizer system 24 further cooperates with the second light collection system 29 to homogenize the illuminance distribution of light to be incident on the diffusive reflection element 30.

The homogenizer system 24 is formed, for example, of a first multi-lens array 24a and a second multi-lens array 24b. The first multi-lens array 24a includes a plurality of first lenses 24am, and the second multi-lens array 24b includes a plurality of second lenses 24bm.

The plurality of second lenses 24bm correspond to the plurality of first lenses 24am.

The fluorescence emission element 27 and the diffusive reflection element 30 are each disposed in a position optically conjugate to the first multi-lens array 24a (first lenses 24am). A light exiting region of each of the semiconductor lasers 21a and 22a is located in a position optically conjugate to the second multi-lens array 24b.

In the present embodiment, the color separation/light combining element 50 is so disposed as to incline by 45° with respect to the optical axes ax1 and ax2. The center of the color separation/light combining element 50 is located at the point of intersection of the optical axes ax1 and ax2 perpendicular to each other.

The color separation/light combining element 50 includes a base 50A, a first dielectric multilayer film 51, and a second dielectric multilayer film 52. The base 50A is formed of a light transmissive substrate having a first surface 50a and a second surface 50b facing each other. The first surface 50a is the surface that faces the light source apparatus 20, and the second surface 50b is the surface facing the diffusive reflection element 30.

In the present embodiment, the first dielectric multilayer film 51 corresponds to the "first optical film" described in the appended claims, and the second dielectric multilayer film 52 corresponds to the "second optical film" described in the appended claims.

The first dielectric multilayer film 51 is provided on part of the first surface 50a of the base 50A. The second dielectric multilayer film 52 is provided on the second surface 50b of the base 50A.

Figure 3:
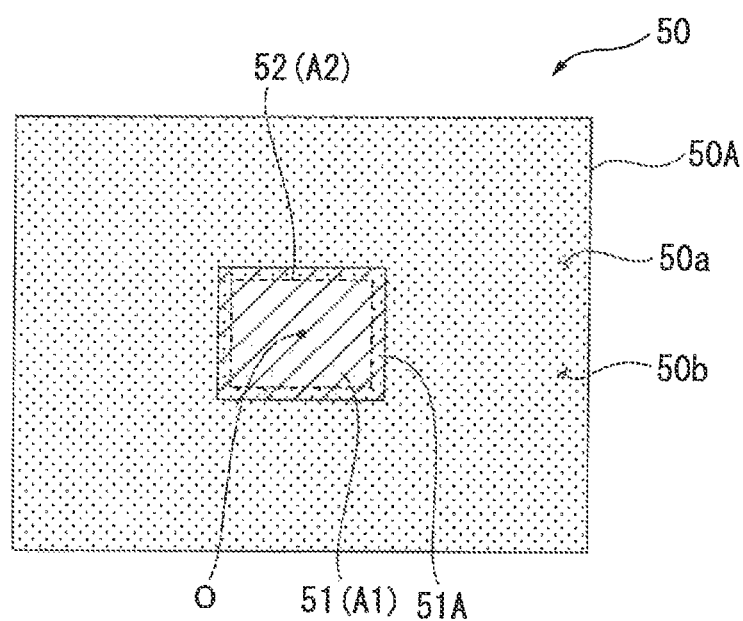
FIG. 3 is a plan view of a color separation/light combining element.

FIG. 3 is a plan view of the color separation/light combining element 50. FIG. 3 is a plan view of the color separation/light combining element 50 viewed from the side facing the first surface 50a.

The first dielectric multilayer film 51 is provided on a central portion of the base 50A in the plan view of the color separation/light combining element 50 viewed from the side facing the first surface 50a, as shown in FIG. 3. The second dielectric multilayer film 52 is so provided that it has a frame shape that surrounds the first dielectric multilayer film 51. A circumferential edge section 51A of the first dielectric multilayer film 51 overlaps with the second dielectric multilayer film 52.

In the present embodiment, the color separation/light combining element 50 has a first region A1 and a second region A2. The first region A1 and the second region A2 differ from each other in terms of the ratio between the reflectance and the transmittance of the light ray flux K.

The first region A1 corresponds to the region on which the first light ray flux K1 is incident, and the second region A2 corresponds to the region on which the second light ray flux K2 is incident.

The first region A1 is formed of the first dielectric multilayer film 51. The second region A2 is formed of the second dielectric multilayer film 52. In more detail, the second region A2 is formed of the second dielectric multilayer film 52 excluding the portion where the first dielectric multilayer film 51 and the second dielectric multilayer film 52 overlap with each other.

According to the present embodiment, in which the circumferential edge section 51A of the first dielectric multilayer film 51 overlaps with the second dielectric multilayer film 52, no gap is created between the first region A1 and the second region A2 in the plan view of the color separation/light combining element 50. The light ray flux K passing through the color separation/light combining element 50 is therefore incident on either the first region A1 or the second region A2, whereby the amount of loss of the light ray flux K can be reduced.

The first region A1 has a shape symmetric around the center axis O of the light ray flux K, as shown in FIG. 3.

The symmetry with respect to the center axis O means rotational symmetry with respect to the center axis O. In the present embodiment, the first region A1 has, for example, a rectangular shape and therefore has a 2-fold rotationally symmetric shape.

The first dielectric multilayer film 51 has optical characteristics in that it transmits part of the first light ray flux K1, which is formed of the blue light, and reflects the remainder of the first light ray flux K1, as shown in FIG. 2. The first dielectric multilayer film 51 has further optical characteristics in that it transmits fluorescence light YL, which is produced by the fluorescence emission element 27 and will be described later.

On the other hand, the second dielectric multilayer film 52 has optical characteristics in that it reflects the second light ray flux K2 and transmits the fluorescence light YL.

That is, the second dielectric multilayer film 52 has a wavelength separation function of transmitting the fluorescence light YL that belongs to a wavelength band (second wavelength band) different from the wavelength band to which the second light ray flux K2 belongs (first wavelength band). The second region A2 formed of the second dielectric multilayer film 52 therefore has a wavelength separation function of separating the first wavelength band and the second wavelength band from each other.

The first region A1 transmits a light ray flux K1a, which is part of the first light ray flux K1, and causes the light ray flux K1a to enter the second light collection system 29. The second light collection system 29 collects the light ray flux K1a and directs the light ray flux K1a toward the diffusive reflection element 30. The second light collection system 29 is formed, for example, of pickup lenses 29a and 29b.

Further, the first region A1 reflects a light ray flux K1b, which is the other part (remainder) of the first light ray flux K1 and causes the light ray flux K1b to enter the first light collection system 26.

The first light collection system 26 collects the light ray flux K1b and directs the light ray flux K1b toward the phosphor layer 34 of the fluorescence emission element 27. The first light collection system 26 is formed, for example, of pickup lenses 26a and 26b.

In the present embodiment, the second region A2 reflects the entire second light ray flux K2 and causes the second light ray flux K2 to enter the first light collection system 26. The first light collection system 26 collects the second light ray flux K2 and directs the second light ray flux K2 toward the phosphor layer 34.

The diffusive reflection element 30 includes a diffusive reflection plate 30A, and the diffusive reflection plate 30A diffusively reflects the light ray flux K1a having exited out of the second light collection system 29 toward the color separation/light combining element 50. The diffusive reflection element 30 is preferably an element that reflects the light ray flux K1a incident thereon in a Lambertian reflection scheme.

The light ray flux K1a diffusively reflected off the diffusive reflection element 30 enters, as diffused blue light K3, the color separation/light combining element 50 via the second light collection system 29. The diffused blue light K3 is reflected off the second region A2 of the color separation/light combining element 50 toward the uniform illumination system 40.

In the illuminator 100 according to the present embodiment, the fluorescence emission element 27 (phosphor layer 34), the diffusive reflection element 30, and the color separation/light combining element 50 are so disposed that the light ray flux K1a is incident on the diffusive reflection element 30 via the first region A1, the light ray flux K1b is incident on the fluorescence emission element 27 via the first region A1, the second light ray flux K2 is incident on the fluorescence emission element 27 via the second region A2, and the second region A2 combines the fluorescence light YL (converted light) with the diffused blue light K3 (reflected light) from the diffusive reflection element 30 with each other to produce the illumination light WL.

That is, in the illuminator 100 according to the present embodiment, the light fluxes outputted from the two light emission units 21 and 22 can be separated into the light ray flux K1b to be incident on the fluorescence emission element 27 and the light ray flux K1a to be incident on the diffusive reflection element 30 with use of no retardation film.

The fluorescence emission element 27 includes the phosphor layer 34, a substrate 35, which supports the phosphor layer 34, and a fixing member 36, which fixes the phosphor layer 34 to the substrate 35. In the present embodiment, the phosphor layer 34 corresponds to the "wavelength conversion element" in the appended claims.

In the fluorescence emission element 27, the phosphor layer 34 is fixed to and supported by the substrate 35 via the fixing member 36, which is provided between the side surface of the phosphor layer 34 and the substrate 35, with a surface of the phosphor layer 34, that is, the surface opposite the side on which the light ray flux K1b is incident, being in contact with the substrate 35.

The phosphor layer 34 contains phosphor particles that absorb the light ray flux K1b, convert the light ray flux K1b into the yellow fluorescence light YL, and output the fluorescence light YL. The phosphor particles can, for example, be a YAG-based (yttrium-aluminum-garnet-based) phosphor. The phosphor particles may be made of one material or may be a mixture of two or more types of particles made of materials different from one another. In the present embodiment, the fluorescence light YL corresponds to the "converted light that belongs to a second wavelength band" in the appended claims.

The phosphor layer 34 preferably excels in heat resistance and surface processability. To achieve the phosphor layer 34, it is preferable to employ, for example, a phosphor layer in which phosphor particles are dispersed in an inorganic binder, such as alumina, or a phosphor layer formed of sintered phosphor particles with use of no binder.

A reflection section 37 is provided on a side of the phosphor layer 34, that is, the side opposite the side on which the light ray flux K1b is incident. The reflection section 37 has the function of reflecting the fluorescence light YL that is produced by the phosphor layer 34 but directed toward the substrate 35. The fluorescence light YL can thus be efficiently extracted from the phosphor layer 34 toward the side facing the first light collection system 26.

Specifically, the reflection section 37 can be formed by providing a reflection film 37a on a surface of the phosphor layer 34, that is, the surface opposite the side on which the light ray flux K1b is incident. In this case, the surface facing the phosphor layer 34 is the reflection surface of the reflection film 37a. The reflection section 37 may instead have a configuration in which the substrate 35 is made of a base material having light reflectance. In this case, the reflection film 37a can be omitted, and the surface facing the phosphor layer 34 can be the reflection surface of the substrate 35.

The fixing member 36 is preferably an inorganic adhesive having light reflectance. In this case, the inorganic adhesive having light reflectance can reflect light that leaks through the side surface of the phosphor layer 34 back into the phosphor layer 34. Light extraction efficiency representing how much the fluorescence light YL produced by the phosphor layer 34 is extracted toward the first light collection system 26 can thus be further increased.

A heat sink 38 is disposed on a surface of the substrate 35, that is, the surface opposite the surface that supports the phosphor layer 34. In the fluorescence emission element 27, since heat can be dissipated via the heat sink 38, thermal degradation of the phosphor layer 34 can be avoided.

Out of the fluorescence light YL produced by the phosphor layer 34, one portion is reflected off the reflection section 37 and caused to exit toward the first light collection system 26. Out of the fluorescence light YL produced by the phosphor layer 34, the other portion is caused to exit toward the first light collection system 26 without traveling via the reflection section 37.

The fluorescence light YL emitted from the phosphor layer 34 is incident on the color separation/light combining element 50 via the first light collection system 26. The fluorescence light YL passes through the second region A2 of the color separation/light combining element 50 and enters the uniform illumination system 40.

According to the color separation/light combining element 50 in the present embodiment, the fluorescence light YL emitted from the phosphor layer 34 passes through the first region A1 and the second region A2. Out of the diffused blue light K3, the portion incident on the second region A2 is reflected off the second regions A2. Out of the diffused blue light K3, part of the portion incident on the first region A1 is reflected off the first region A1. The illumination light WL is thus efficiently produced.

According to the illuminator 100 of the present embodiment, the controller 60 can control the first light emission unit 21 and the second light emission unit 22 to adjust the ratio between the amount of the first light ray flux K1 and the amount of the second light ray flux K2. The color balance (white balance) of the illumination light WL can thus be adjusted.

In the present embodiment, the controller 60 controls the first light emission unit 21 and the second light emission unit 22 in such a way that the ratio between the blue light (diffused blue light K3) and the yellow light (fluorescence light YL), which produce the illumination light WL, is, for example, 1:4.

The illumination light WL enters the uniform illumination system 40.

The uniform illumination system 40 includes an optical integration system 31, a polarization conversion element 32, and a superimposing system 33. The uniform illumination system 40 homogenizes the intensity distribution of the illumination light WL in an illuminated region. The illumination light WL having exited out of the uniform illumination system 40 enters the color separation/light guide system 200.

Specifically, the optical integration system 31 is formed, for example, of a lens array 31a and a lens array 31b. The lens arrays 31a and 31b are each formed of a plurality of lenses arranged in an array.

The illumination light WL having passed through the optical integration system 31 is incident on the polarization conversion element 32. The polarization conversion element 32 is formed, for example, of polarization separation films and retardation films and converts the illumination light WL into linearly polarized light. The polarization conversion element 32 is not essentially required.

The illumination light WL having passed through the polarization conversion element 32 enters the superimposing system 33. The superimposing system 33 is formed, for example, of a superimposing lens and superimposes the illumination light WL having exited out of the polarization conversion element 32 on the illuminated region. In the present embodiment, the optical integration system 31 and the superimposing system 33 homogenize the illuminance distribution in the illuminated region.

As described above, the illuminator 100 according to the present embodiment can separate the light fluxes outputted from the two light emission units 21 and 22 into the light ray flux K1b to be incident on the fluorescence emission element 27 and the light ray flux K1a to be incident on the diffusive reflection element 30 with use of no retardation film to produce the illumination light WL. The part cost of the illuminator 100 can therefore be reduced.

The cost of the projector 1 including the illuminator 100 according to the present embodiment can therefore be reduced. Further, the projector 1 according to the present embodiment, in which the illuminator 100 optimally adjusts the white balance of the illumination light WL, can display a high-quality image.

Further, in the color separation/light combining element 50 in the present embodiment, the first region A1 has a shape symmetric around the center axis O of the light ray flux K to be incident on the color separation/light combining element 50. The combined illumination light WL from the color separation/light combining element 50 therefore has a state in which the diffused blue light K3 and the fluorescence light YL are uniformly distributed around the center axis of the illumination light WL. The uniform illumination system 40 can therefore use the thus formed illumination light WL to readily superimpose the diffused blue light K3 and the fluorescence light YL on each other in the illuminated region (image formation region of each of light modulators 400R, 400G, and 400B). A high-quality image can therefore be displayed.

Second Embodiment

An illuminator according to a second embodiment will be subsequently described. The present embodiment differs from the first embodiment in terms of the configuration of the illuminator, and the other configurations are the same. In the following description, members and components common to those in the embodiment described above have the same reference characters and will not be described in detail.

Figure 4:
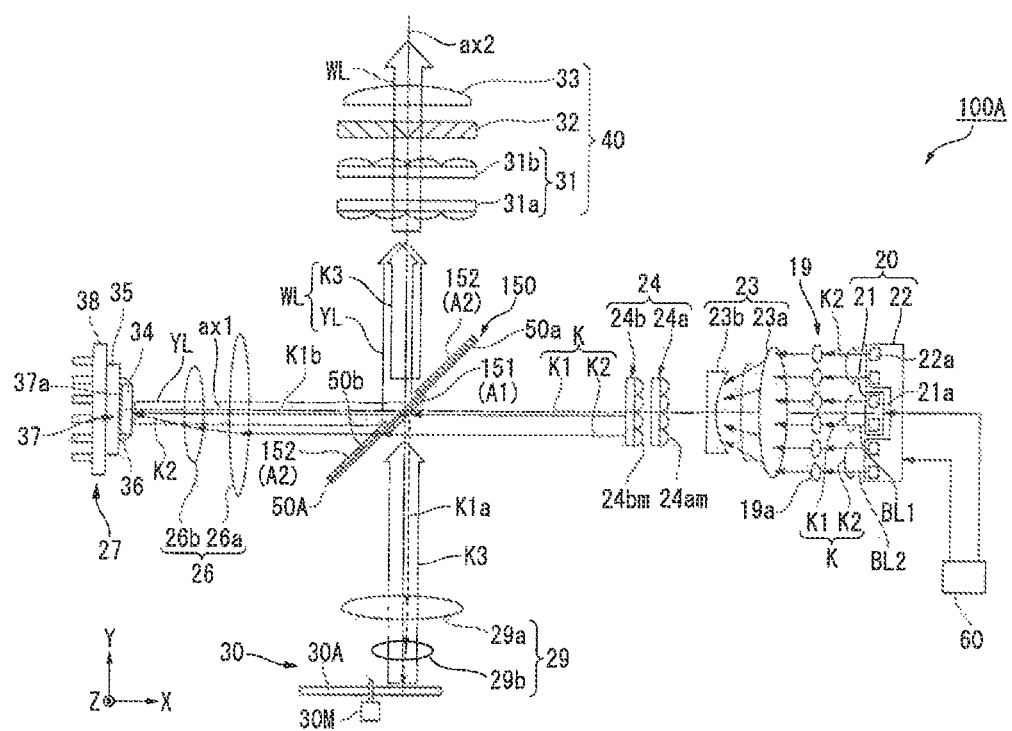
FIG. 4 is a plan view showing a schematic configuration of an illuminator according to a second embodiment.

FIG. 4 is a plan view showing a schematic configuration of an illuminator 100A according to the present embodiment.

The illuminator 100A includes the light source apparatus 20, the collimator system 19, the afocal system 23, the homogenizer system 24, a color separation/light combining element 150, the first light collection system 26, the fluorescence emission element 27, the second light collection system 29, the diffusive reflection element 30, the uniform illumination system 40, and the controller 60, as shown in FIG. 4.

In the present embodiment, the light source apparatus 20, the collimator system 19, the afocal system 23, the homogenizer system 24, the color separation/light combining element 150, the first light collection system 26, and the fluorescence emission element 27 are sequentially arranged along the optical axis ax1.

On the other hand, the diffusive reflection element 30, the second light collection system 29, the color separation/light combining element 150, and the uniform illumination system 40 are sequentially arranged along the optical axis ax2.

That is, in the illuminator 100A according to the present embodiment, the positional relationship of the fluorescence emission element 27 and the diffusive reflection element 30 with the light source apparatus 20 is reversed from the positional relationship in the illuminator 100 according to the first embodiment.

The color separation/light combining element 150 includes the base 50A, a first dielectric multilayer film 151, and a second dielectric multilayer film 152. The first dielectric multilayer film 151 forms the first region A1, and the second dielectric multilayer film 152 forms the second region A2.

The color separation/light combining element 150 has the same configuration as that of the color separation/light combining element 50 in the first embodiment except that the first dielectric multilayer film 151 and the second dielectric multilayer film 152 have different optical characteristics.

In the present embodiment, the first dielectric multilayer film 151 has optical characteristics in that it reflects part of the first light ray flux K1 formed of the blue light and transmits the remainder of the first light ray flux K1. The first dielectric multilayer film 151 has further optical characteristics in that it reflects the fluorescence light YL produced by the fluorescence emission element 27.

On the other hand, the second dielectric multilayer film 152 has optical characteristics in that it transmits the second light ray flux K2 and reflects the fluorescence light YL.

In the present embodiment, the first region A1 reflects the light ray flux K1a, which is part of the first light ray flux K1, to cause the light ray flux K1a to be incident on the diffusive reflection element 30. The diffused blue light K3 diffusively reflected off the diffusive reflection element 30 passes through the second region A2 of the color separation/light combining element 150.

Part of the diffused blue light K3 incident on the first region A1 passes through the first dielectric multilayer film 151, which forms the first region A1, and is therefore used to produce the illumination light WL. Loss of the diffused blue light K3 in the combination process of producing the illumination light WL can therefore be reduced.

In the present embodiment, the first dielectric multilayer film 151, which forms the first region A1, has characteristics in that it transmits the diffused blue light K3. Therefore, in the configuration of the present embodiment, the first dielectric multilayer film 151 may be so formed as to entirely overlap with the second dielectric multilayer film 152 in the plan view.

The first region A1 transmits the light ray flux K1b, which is the other part (remainder) of the first light ray flux K1, to cause the light ray flux K1b to be incident on the fluorescence emission element 27. The second region A2 transmits the entire second light ray flux K2 to cause the second light ray flux K2 to be incident on the fluorescence emission element 27.

In the present embodiment, the fluorescence light YL emitted from the phosphor layer 34 is reflected off the first region A1 and the second region A2. Out of the diffused blue light K3, the portion incident on the second region A2 passes through the second region A2. Out of the diffused blue light K3, part of the portion incident on the first region A1 passes through the first region A1. The illumination light WL is thus produced.

The illuminator 100A according to the present embodiment can also separate the light fluxes outputted from the two light emission units 21 and 22 into the light ray flux K1b to be incident on the fluorescence emission element 27 and the light ray flux K1a to be incident on the diffusive reflection element 30 with use of no retardation film to produce the illumination light WL.

Third Embodiment

An illuminator according to a third embodiment will be subsequently described. The present embodiment differs from the first embodiment in terms of the configuration of the illuminator, and the other configurations are the same. In the following description, members and components common to those in the embodiments described above have the same reference characters and will not be described in detail.

Figure 5:
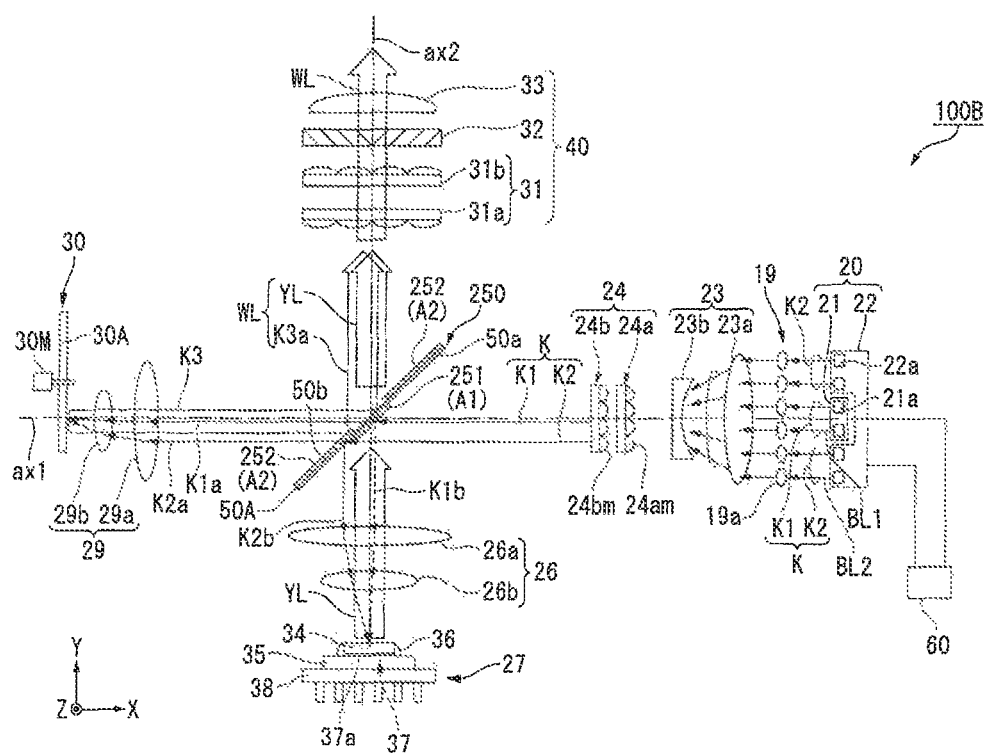
FIG. 5 is a plan view showing a schematic configuration of an illuminator according to a third embodiment.

FIG. 5 is a plan view showing a schematic configuration of an illuminator 100B according to the present embodiment.

The illuminator 100B includes the light source apparatus 20, the collimator system 19, the afocal system 23, the homogenizer system 24, a color separation/light combining element 250, the first light collection system 26, the fluorescence emission element 27, the second light collection system 29, the diffusive reflection element 30, the uniform illumination system 40, and the controller 60, as shown in FIG. 5.

In the present embodiment, the color separation/light combining element 250 includes the base 50A, a first dielectric multilayer film 251, and a second dielectric multilayer film 252. The first dielectric multilayer film 251 forms the first region A1, and the second dielectric multilayer film 252 forms the second region A2. The color separation/light combining element 250 has the same configuration as that of the color separation/light combining element 50 in the first embodiment except that the first dielectric multilayer film 251 and the second dielectric multilayer film 252 have different optical characteristics.

In the present embodiment, the first dielectric multilayer film 251 has optical characteristics in that it reflects part of the first light ray flux K1 formed of the blue light and transmits the remainder of the first light ray flux K1. The first dielectric multilayer film 251 has further optical characteristics in that it transmits the fluorescence light YL.

On the other hand, the second dielectric multilayer film 252 has optical characteristics in that it reflects part of the second light ray flux K2 and transmits the remainder of the second light ray flux K2. The second dielectric multilayer film 252 has further optical characteristics in that it transmits the fluorescence light YL.

In the present embodiment, the first dielectric multilayer film 251 and the second dielectric multilayer film 252 differ from each other in terms of the reflectance of the blue light (light ray flux K1). For example, the first dielectric multilayer film 251 has reflectance of the blue light (first light ray flux K1) set at 30%, and the second dielectric multilayer film 252 has reflectance of the blue light (second light ray flux K2) set at 10%. Configuring the first dielectric multilayer film 251 and the second dielectric multilayer film 252 to differ from each other in terms of the reflectance of the blue light (light ray flux K) as described above also allows generation of bright illumination light WL, as in the first embodiment.

In the present embodiment, the first region A1 transmits the light ray flux K1a, which is part of the first light ray flux K1, to cause the light ray flux K1a to be incident on the diffusive reflection element 30. The second region A2 transmits a light ray flux K2a, which is part of the second light ray flux K2, to cause the light ray flux K2a to be incident on the diffusive reflection element 30. The diffusive reflection element 30 reflects the light ray fluxes K1a and K2a as the diffused blue light K3. Diffused blue light K3a, which is part of the diffused blue light K3, is reflected off the first region A1 and the second region A2 of the color separation/light combining element 250.

The first region A1 reflects the light ray flux K1b, which is the other part (remainder) of the first light ray flux K1, to cause the light ray flux K1b to be incident on the fluorescence emission element 27. The second region A2 reflects a light ray flux K2b, which is the other part (remainder) of the second light ray flux K2, to cause the second light ray flux K2b to be incident on the fluorescence emission element 27.

In the present embodiment, the fluorescence light YL is produced by converting the light ray flux K1b and the light ray flux K2b. The fluorescence light YL emitted from the phosphor layer 34 passes through the first region A1 and the second region A2 of the color separation/light combining element 250 and is combined with the diffused blue light K3a reflected off the first region A1 and the second region A2 to produce the illumination light WL.

The illuminator 100B according to the present embodiment can also separate the light fluxes outputted from the two light emission units 21 and 22 into the light ray flux K1b to be incident on the fluorescence emission element 27 and the light ray flux K1a to be incident on the diffusive reflection element 30 with use of no retardation film to produce the illumination light WL.

Fourth Embodiment

An illuminator according to a fourth embodiment will be subsequently described. The present embodiment differs from the first embodiment in terms of the configuration of the illuminator, and the other configurations are the same. In the following description, members and components common to those in the embodiments described above have the same reference characters and will not be described in detail.

Figure 6:
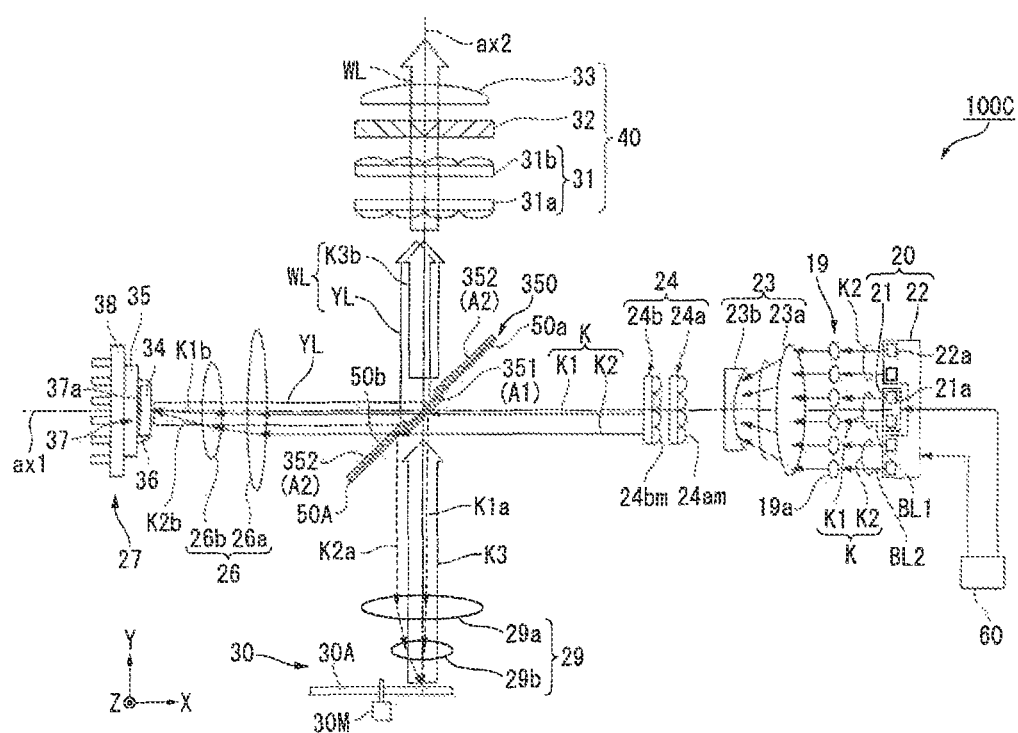
FIG. 6 is a plan view showing a schematic configuration of an illuminator according to a fourth embodiment.

FIG. 6 is a plan view showing a schematic configuration of an illuminator 100C according to the present embodiment.

The illuminator 100C includes the light source apparatus 20, the collimator system 19, the afocal system 23, the homogenizer system 24, a color separation/light combining element 350, the first light collection system 26, the fluorescence emission element 27, the second light collection system 29, the diffusive reflection element 30, the uniform illumination system 40, and the controller 60, as shown in FIG. 6.

In the present embodiment, the light source apparatus 20, the collimator system 19, the afocal system 23, the homogenizer system 24, the color separation/light combining element 350, the first light collection system 26, and the fluorescence emission element 27 are sequentially arranged along the optical axis ax1.

On the other hand, the diffusive reflection element 30, the second light collection system 29, the color separation/light combining element 350, and the uniform illumination system 40 are sequentially arranged along the optical axis ax2.

That is, in the illuminator 100C according to the present embodiment, the positional relationship of the fluorescence emission element 27 and the diffusive reflection element 30 with the light source apparatus 20 is reversed from the positional relationship in the illuminator 100B according to the third embodiment.

The color separation/light combining element 350 includes the base 50A, a first dielectric multilayer film 351, and a second dielectric multilayer film 352. The first dielectric multilayer film 351 forms the first region A1, and the second dielectric multilayer film 352 forms the second region A2. The color separation/light combining element 350 has the same configuration as that of the color separation/light combining element 50 in the first embodiment except that the first dielectric multilayer film 351 and the second dielectric multilayer film 352 have different optical characteristics.

In the present embodiment, the first dielectric multilayer film 351 has optical characteristics in that it reflects part of the first light ray flux K1 formed of the blue light and transmits the remainder of the first light ray flux K1. Further, the first dielectric multilayer film 351 has optical characteristics in that it reflects the fluorescence light YL.

On the other hand, the second dielectric multilayer film 352 has optical characteristics in that it reflects part of the second light ray flux K2 and transmits the remainder of the second light ray flux K2. The second dielectric multilayer film 352 has further optical characteristics in that it reflects the fluorescence light YL.

In the present embodiment, the first dielectric multilayer film 351 has reflectance of the blue light (first light ray flux K1) set at 70%, and the second dielectric multilayer film 352 has reflectance of the blue light (second light ray flux K2) set at 90%.

The first region A1 transmits the light ray flux K1b to cause the light ray flux K1b to be incident on the fluorescence emission element 27. The second region A2 transmits the light ray flux K2b to cause the light ray flux K2b to be incident on the fluorescence emission element 27. Diffused blue light K3b, which is part of the diffused blue light K3 diffusively reflected off the diffusive reflection element 30, passes through the first region A1 and the second region A2 of the color separation/light combining element 350.

The fluorescence light YL emitted from the phosphor layer 34 is reflected off the first region A1 and the second region A2 of the color separation/light combining element 350 and combined with the diffused blue light K3b having passed through the first region A1 and the second region A2 to produce the illumination light WL.

The illuminator 100C according to the present embodiment can also separate the light fluxes outputted from the two light emission units 21 and 22 into the light ray flux K1b to be incident on the fluorescence emission element 27 and the light ray flux K1a to be incident on the diffusive reflection element 30 with use of no retardation film to produce the illumination light WL.

The invention is not limited to the contents in the embodiments described above, and the embodiments described above can be changed as appropriate to the extent that the change do not depart from the substance of the invention.

For example, in the embodiments described above, the color separation/light combining elements 50, 150, 250, and 350 each have the single first region A1 and the single second region A2 by way of example, but not necessarily in the invention. That is, the color separation/light combining element may have a plurality of first regions A1.

Figure 7:
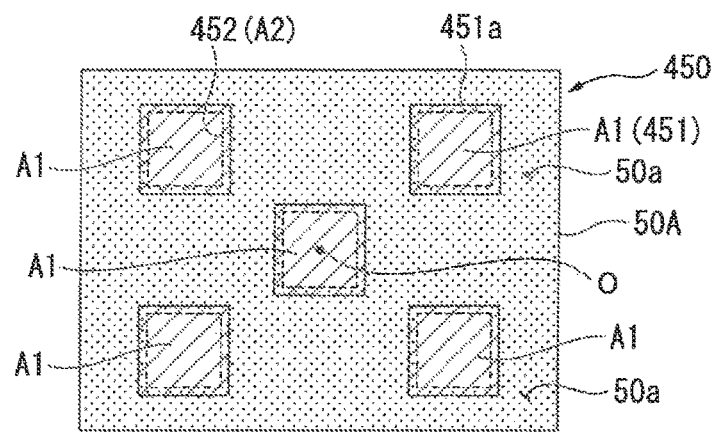
FIG. 7 is a plan view of a color separation/light combining element according to a variation.

FIG. 7 is a plan view of a color separation/light combining element 450 according to a variation. The color separation/light combining element 450 has a plurality of (five) first regions A1 and one second region A2 on the base 50A, as shown in FIG. 7. The first regions A1 are formed of a first dielectric multilayer film 451, and the second region A2 is formed of a second dielectric multilayer film 452.

The first regions A1 are so provided that one first region A1 is located in a central portion (at center axis O of light ray flux K) of the base 50A and four first regions A1 are located in positions equidistant from the center axis O (rotationally symmetric around center axis O) in a plan view of the base 50A viewed from the side facing the first surface 50a.

The second region A2 is provided on the second surface 50b of the base 50A. Part of each of the first regions A1 (circumferential edge section 451a of first dielectric multilayer film 451) overlaps with the second region A2 (second dielectric multilayer film 452). The second dielectric multilayer film 452, which forms the second region A2, is cut off in the portions where the first regions A1 are present but except the portions where the first regions A1 overlap with the second regions A2 (circumferential edge sections 451a).

In the color separation/light combining element 450 according to the present variation, the plurality of first regions A1 are so disposed as to be rotationally symmetric around the center axis O. The combined illumination light WL from the color separation/light combining element 450 therefore has a state in which the diffused blue light K3a and the fluorescence light YL are uniformly distributed around the optical axis of the illumination light WL. The thus formed illumination light WL has improved superimposition of the diffused blue light K3a and the fluorescence light YL in the illuminated region, whereby a high-quality image can be displayed.

Figure 8:
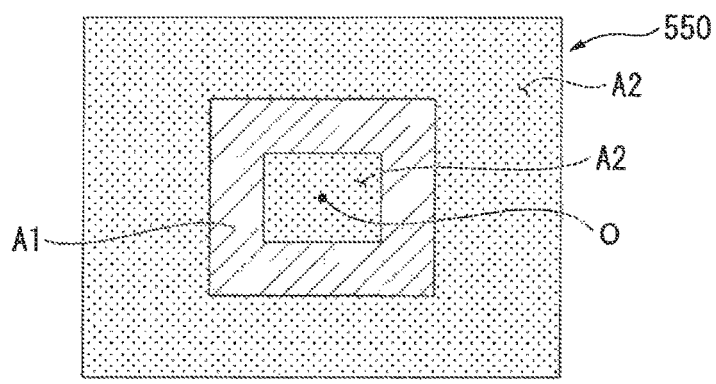
FIG. 8 is a plan view of a color separation/light combining element according to another variation.

As another variation, the first region A1 may have a frame-like shape, as in a color separation/light combining element 550 shown in FIG. 8. In this case, the second region A2 is provided inside and outside the frame-shaped first region A1 in a plan view.

Figure 9:
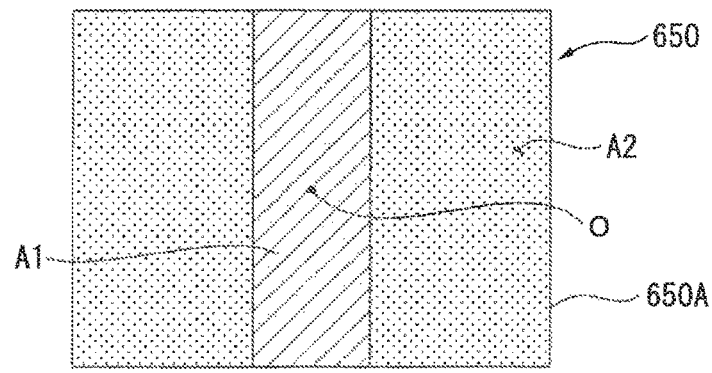
FIG. 9 is a plan view of a color separation/light combining element according to another variation.

Still instead, the color separation/light combining element may be so shaped that the longitudinal width of a rectangular first region A1 is equal to the lateral width of a base 650A, as in a color separation/light combining element 650 shown in FIG. 9. In this case, a large area of the first region A1 can be provided.

In each of the embodiments and variations described above, as each of the color separation/light combining elements, the first dielectric multilayer film and the second dielectric multilayer film are formed on different surfaces of the base by way of example, but the base may be omitted and only two dielectric multilayer films may form the color separation/light combining element. Still instead, two dielectric multilayer films may be formed on the same surface of the base.

In the embodiments described above, the projector 1 including the three light modulators 400R, 400G, and 400B is presented by way of example, and the invention is also applicable to a projector that displays color video images via one light modulator. Further, a digital mirror device may be used as each of the light modulators.

In the embodiments described above, the illuminator including the homogenizer system 24 is presented, but the homogenizer system 24 is not essentially required.

In the embodiments described above, the case where the illuminator according to any of the embodiments described above is incorporated in a projector is presented, but not necessarily. The illuminator according to any of the embodiments of the invention can also be used, for example, in a lighting apparatus and an automobile headlight.

The entire disclosure of Japanese Patent Application No. 2017-033022, filed on Feb. 24, 2017 is expressly incorporated by reference herein.

What is claimed is:

1. An illuminator comprising:
   a light source apparatus that includes a first light emission unit and a second light emission unit and outputs a light ray flux that belongs to a first wavelength band;
   a wavelength conversion element that converts the light ray flux into converted light that belongs to a second wavelength band;
   a color separation/light combining element that is provided in an optical path between the light source apparatus and the wavelength conversion element and reflects or transmits the converted light; and
   a diffusive reflection element,
   wherein the color separation/light combining element has at least one first region and at least one second region that differ from each other in terms of a ratio between reflectance and transmittance of the light ray flux,
   the light ray flux outputted from the light source apparatus contains a first light ray flux outputted from the first light emission unit and a second light ray flux outputted from the second light emission unit, and
   the wavelength conversion element, the diffusive reflection element, and the color separation/light combining element are so disposed that
   part of the first light ray flux is incident on the diffusive reflection element via the first region,
   another part of the first light ray flux is incident on the wavelength conversion element via the first region,
   at least part of the second light ray flux is incident on the wavelength conversion element via the second region, and
   the second region combines the converted light with at least part of light reflected off the diffusive reflection element to produce illumination light.

2. The illuminator according to claim 1, wherein the second region has a wavelength separation function of separating light that belongs to the first wavelength band and light that belongs to the second wavelength band from each other.

3. A projector comprising:
   the illuminator according to claim 2;
   a light modulator that modulates light from the illuminator in accordance with image information to produce image light; and
   a projection system that projects the image light.

4. The illuminator according to claim 1, wherein the at least one first region has a shape symmetric around a center axis of the light ray flux.

5. The illuminator according to claim 4,
   wherein the at least one first region is formed of a plurality of first regions, and
   the plurality of first regions are arranged symmetrically around the center axis of the light ray flux.

6. A projector comprising:
   the illuminator according to claim 5;
   a light modulator that modulates light from the illuminator in accordance with image information to produce image light; and
   a projection system that projects the image light.

7. A projector comprising:
   the illuminator according to claim 4;
   a light modulator that modulates light from the illuminator in accordance with image information to produce image light; and
   a projection system that projects the image light.

8. The illuminator according to claim 1,
   wherein the color separation/light combining element includes a substrate having a first surface and a second surface facing each other, a first optical film that forms the at least one first region, and a second optical film that forms the at least one second region,
   the first optical film is provided on the first surface of the substrate,
   the second optical film is provided on the second surface of the substrate, and
   at least part of the first optical film overlaps with the second optical film in a plan view of the color separation/light combining element.

9. A projector comprising:
the illuminator according to claim 8;
a light modulator that modulates light from the illuminator in accordance with image information to produce image light; and
a projection system that projects the image light.

10. The illuminator according to claim 1, further comprising a controller that controls the first light emission unit and the second light emission unit in such a way that a ratio between an amount of the first light ray flux and an amount of the second light ray flux is adjusted.

11. A projector comprising:
the illuminator according to claim 10;
a light modulator that modulates light from the illuminator in accordance with image information to produce image light; and
a projection system that projects the image light.

12. A projector comprising:
the illuminator according to claim 1;
a light modulator that modulates light from the illuminator in accordance with image information to produce image light; and
a projection system that projects the image light.

* * * * *